W. E. PHILIPS.
WHEEL.
APPLICATION FILED APR. 2, 1921.
1,427,320.
Patented Aug. 29, 1922.
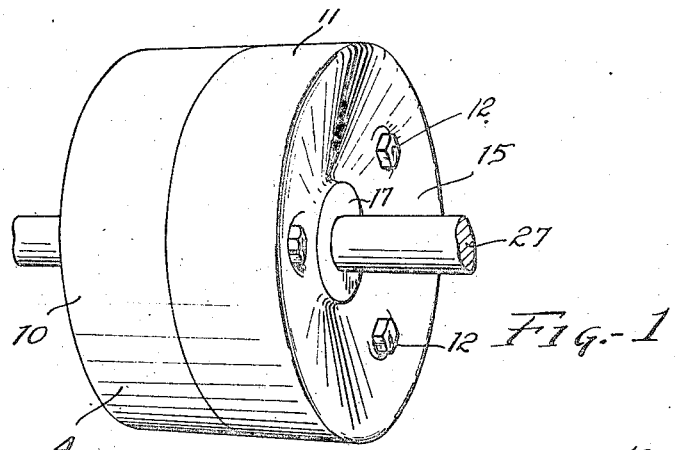
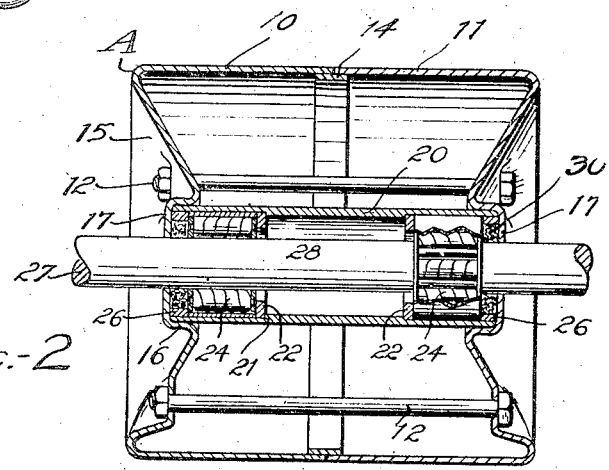
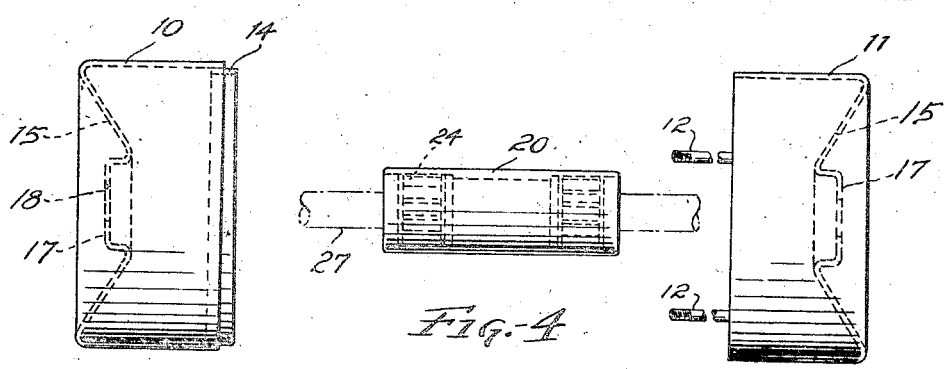
INVENTOR
William E. Philips
BY Bates & Macklin,
ATTORNEYS

UNITED STATES PATENT OFFICE.

WILLIAM E. PHILIPS, OF CLEVELAND, OHIO, ASSIGNOR TO THE STEARNS CONVEYOR COMPANY, OF CLEVELAND, OHIO, A CORPORATION OF OHIO.

WHEEL.

1,427,320.   Specification of Letters Patent.   Patented Aug. 29, 1922.

Application filed April 2, 1921. Serial No. 457,847.

*To all whom it may concern:*

Be it known that I, WILLIAM E. PHILIPS, a citizen of the United States, residing at Cleveland, in the county of Cuyahoga and State of Ohio, have invented a certain new and useful Improvement in Wheels, of which the following is a full, clear, and exact description, reference being had to the accompanying drawings.

This invention relates to hollow metal wheels and particularly to wheels made from stamped sheet metal.

One of the objects of the invention is to provide a wheel of complementary parts which are adapted to be secured together in a manner to afford a substantial and rigid structure.

Another object of the invention is to provide a novel lubricating means for a metal wheel.

Other objects of the invention will be apparent from the following description taken in connection with the accompanying drawings wherein Fig. 1 is a perspective view of a wheel embodying my invention; Fig. 2 is a central longitudinal section of the wheel and Figs. 3, 4 and 5 are elevations of the two end members and the bearing sleeve in disassembled relation.

Referring to the drawing by reference characters, I have shown at A, a wheel made of two parts, 10 and 11, secured together by suitable fastening means indicated as bolts 12. The two parts, 10 and 11, are similar, the only difference shown being that the portion 10 is provided with a ring 14 which may be spot-welded thereto. This ring is arranged to telescopically fit into the portion 11 to provide a reinforcement for the tread.

Each portion of the wheel comprises a cylindrical part, the end of which is cupped, as at 15. The cupped portion is shown as merging into an outwardly extending portion 16 which may be cylindrical as shown and from this cylindrical portion 16 the metal is bent to form a radially inwardly directed flange 17 through which an aperture 18 extends.

Seated within the cylindrical portion 16 is shown a sleeve 20, having a reduced internal diameter intermediate its ends to provide a shoulder 21. Seated against the shoulders I have shown washers 22. Adjacent each washer 22 I may arrange a roller bearing unit 24 of any suitable type such as is in well known use in the trade. The end of each roller unit 24 opposite the washer 22 bears against a second washer 26, which also bears upon the flange 17 on the wheel member.

The wheel is shown as mounted on a suitable axle 27 and the construction is such that an annular space 28 is provided between the sleeve 20 and the axle 27. In this space 28 I propose to place suitable lubricating material.

It will be noted that the washers 21 are shown as having their inner diameter greater than the diameter of the shaft 27, so that the lubricant can readily pass from the chamber 28 to the anti-friction members 24. To prevent leakage of the lubricant from the chamber 28 I provide suitable packing 30.

In assembling the wheel, the bearing sleeve 20 having the bearings inclosed and suitably filled with lubricant, is arranged upon the axle 27. The two halves of the wheel are then brought together on the axle, with the bearing sleeve fitting within the cylindrical portions 16. The bolts 12 are then inserted and the nuts tightened. The chamber 28 is of sufficient size so that the lubricant contained therein will serve to lubricate the bearings for a great length of time.

I claim:

1. A hollow wheel comprising connected sheet metal members, each member having a disk-like web and an outwardly extending cupped portion formed at the hub, said cupped portions having their peripheral walls extending for some distance parallel with the axis of the wheel and a sleeve seated in the two cupped portions and contacting with the inner periphery thereof.

2. A hollow wheel comprising connected sheet metal members, each member having a disk-like web and an outwardly extending cupped portion formed at the hub, said cupped portions having their peripheral walls extending for some distance parallel with the axis of the wheel, a sleeve seated in the two cupped portions and contacting with the inner periphery thereof, and anti-friction means mounted within said sleeve.

3. A hollow wheel comprising connected sheet metal members, each member having a disk-like web and an outwardly extending cupped portion formed at the hub, said cupped portions having their peripheral walls extending for some distance parallel with the axis of the wheel, a sleeve seated in the two cupped portions and contacting with the inner periphery thereof, and means to hold said sleeve in place, said means comprising flanges.

4. A wheel comprising a pair of complementary members, each member having a tread portion and an inner cupped portion, a bearing sleeve mounted in said cupped portion, and an anti-friction means mounted within said sleeve.

5. A wheel comprising a pair of complementary members, each member having an inner cupped portion, a bearing sleeve mounted in the said cupped portion, and anti-friction means within said sleeve.

6. A wheel comprising a pair of complementary members, each member having a tread portion, and an inner peripheral portion, said inner portions being inwardly flanged, and a bearing sleeve mounted in said inner portions.

7. A wheel comprising a pair of complementary members, each member having an inner cupped portion, a bearing sleeve mounted in the said cupped portions, an anti-friction means held in operative position within said sleeve.

8. A wheel comprising a pair of complementary members, each member having inner cupped portions and a bearing sleeve mounted in said cupped portions, an anti-friction means mounted within said sleeve, and an axle mounted within and spaced from said sleeve.

9. A wheel comprising a pair of sheet metal members having tread portions thereon, means connecting the tread portions, web portions extending inwardly from said tread portions, said web portions terminating in outwardly extending cupped flanges, and a sleeve mounted between said flanges.

10. A wheel comprising a pair of complementary members detachably secured together, said wheel having coaxial spaced inner peripheral portions and tread portions, a sleeve mounted within the inner peripheral portions, an axle for said wheel spaced from said sleeve to form a lubricant chamber, a portion of said complementary members extending over the ends of the sleeve to close the same.

11. A hollow wheel comprising connected sheet metal members, each member having a disk-like web and an outwardly extending cupped portion formed at the hub, said cupped portions having their peripheral walls extending for some distance parallel with the axis of the wheel, a sleeve seated in the two cupped portions and contacting with the inner periphery thereof, anti-friction means mounted within said sleeve, and an axle supported on said anti-friction means and spaced from said sleeve to form a lubricant chamber.

12. A hollow wheel comprising connected sheet metal members, each member having a disk-like web and an outwardly extending cupped portion formed at the hub, said cupped portions having their peripheral walls extending for some distance parallel with the axis of the wheel, a sleeve seated in the two cupped portions and contacting with the inner periphery thereof, anti-friction means mounted within said sleeve, an axle supported on said anti-friction means and spaced from said sleeve to form a lubricant chamber, and means to afford communication between the lubricant chamber and the anti-friction means.

13. A wheel comprising a pair of complementary members detachably secured together, said wheel having coaxially spaced inner peripheral portions and tread portions, a sleeve mounted within the inner peripheral portions, an axle for said wheel spaced from said sleeve to form a lubricant chamber, a portion of said complementary members extending over the ends of the sleeve to close the same, and anti-friction means between said axle and sleeve.

14. A wheel comprising a pair of complementary members, each member having an inner cupped portion, a sleeve mounted in said cupped portion, anti-friction means mounted in said sleeve, an axle in said sleeve and spaced therefrom, the space between the axle and sleeve being filled with lubricant, and means to afford communication between the lubricant chamber and the anti-frictional means.

15. A wheel comprising a pair of complementary members detachably secured together, said wheel having a cylindrical tread portion and a pair of spaced inner cupped portions, a sleeve mounted in the said cupped portions, and extending therebetween, anti-friction means mounted within said sleeve, an axle supported on said anti-friction means and spaced from said sleeve to form a lubricant chamber, means to afford communication between the lubricant chamber and the anti-friction means, and means to prevent loss of the lubricant.

16. A wheel comprising complementary members detachably secured together, said members having co-axial spaced inner peripheral portions and tread portions, a sleeve mounted within the inner peripheral portion and held immovably in place therein but readily removable by separation of said members.

17. A wheel comprising complementary members detachably secured together, said members having co-axial spaced inner peripheral portions and tread portions, a sleeve mounted within the inner peripheral portion and means holding said members together, said sleeve having its ends abutting said members respectively, and closed thereby.

18. A wheel comprising a pair of complementary members, each member comprising a tread portion and an end portion extending at an angle thereto, a tubular sleeve arranged co-axially with the tread portions, said complementary members having means for engaging the sleeve and for holding the sleeve immovably in place when the members are held in position and means between the end portions for holding the members detachably secured together.

19. A wheel comprising a pair of complementary members each member comprising a tread and an end portion extending at an angle thereto, a tubular sleeve arranged co-axially with said tread portion, said tube engaging the end portions and means for holding said complementary members together comprising a rod extending through the ends of the complementary members.

20. A wheel comprising a pair of complementary members, each member comprising a tread and an end portion inclined inwardly at an angle thereto, a tubular sleeve arranged co-axially with said portions, and serving as a spacing means for maintaining said ends in spaced relation from each other throughout their extent.

21. A wheel comprising a pair of complementary members each having a tread portion and an end portion extending at an angle thereto, said end portions being spaced from each other throughout their extent, a tubular sleeve mounted between said complementary members, the end portions of said members having means for retaining said sleeve portion and means passing through the spaced end portions of said members for detachably securing them in place.

22. A wheel comprising complementary members, each having a tread portion and an end portion extending therefrom, a sleeve between said end portions, said end portions overlapping the sleeve adjacent its ends respectively, and extending radially inward thereof, an axle passing through said sleeve and ends, antifriction means located at each end of and within said sleeve and spacing the sleeve and axle whereby a lubricant retaining space is maintained therein.

In testimony whereof, I hereunto affix my signature.

WILLIAM E. PHILIPS.